United States Patent
Cao (10) Patent No.: US 11,514,661 B2
(45) Date of Patent: Nov. 29, 2022

(54) METHOD, SYSTEM AND APPARATUS FOR PATTERN RECOGNITION

(71) Applicant: Nokia Technologies Oy, Espoo (FI)

(72) Inventor: Jiale Cao, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 388 days.

(21) Appl. No.: 16/638,830

(22) PCT Filed: Aug. 21, 2017

(86) PCT No.: PCT/CN2017/098317
§ 371 (c)(1),
(2) Date: Feb. 13, 2020

(87) PCT Pub. No.: WO2019/036845
PCT Pub. Date: Feb. 28, 2019

(65) Prior Publication Data
US 2020/0193213 A1    Jun. 18, 2020

(51) Int. Cl.
*G06V 10/50* (2022.01)
*G06K 9/62* (2022.01)
(Continued)

(52) U.S. Cl.
CPC ......... *G06V 10/507* (2022.01); *G06K 9/6256* (2013.01); *G06N 3/04* (2013.01);
(Continued)

(58) Field of Classification Search
None
See application file for complete search history.

(56) References Cited

U.S. PATENT DOCUMENTS

| | | | |
|---|---|---|---|
| 6,134,538 A | 10/2000 | Mager et al. | |
| 6,549,646 B1 | 4/2003 | Yeh et al. | |
| 2016/0086078 A1 | 3/2016 | Ji et al. | |

FOREIGN PATENT DOCUMENTS

| | | |
|---|---|---|
| CN | 1445715 A | 10/2003 |
| CN | 105740892 A | 7/2016 |

(Continued)

OTHER PUBLICATIONS

Extended European Search Report received for corresponding European Patent Application No. 17922781.4, dated Mar. 5, 2021, 7 pages.

(Continued)

*Primary Examiner* — Leon Flores
(74) *Attorney, Agent, or Firm* — Fay Sharpe LLP (57) ABSTRACT

A method for pattern recognition may be provided, comprising: receiving data; processing the data with a trained convolutional neural network so as to recognize a pattern in the data, wherein the convolutional neural network comprises at least: an input layer, at least one convolutional layer, at least one batch normalization layer, at least one activation function layer, and an output layer; and wherein processing the data with a trained convolutional neural network so as to recognize a pattern in the data comprises: processing values outputted by a batch normalization layer so that the histogram of the processed values is flatter than the histogram of the values, and outputting the processed values to an activation function layer. A corresponding apparatus and system for pattern recognition, as well as a computer readable medium, a method for implementing a convolutional neural network and a convolutional neural network are also provided.

17 Claims, 4 Drawing Sheets

(51) Int. Cl.
  *G06N 3/04* (2006.01)
  *G06N 3/08* (2006.01)
  *G06V 10/20* (2022.01)
  *G06V 10/98* (2022.01)
(52) U.S. Cl.
  CPC ............... *G06N 3/08* (2013.01); *G06V 10/20* (2022.01); *G06V 10/98* (2022.01)

(56) References Cited

FOREIGN PATENT DOCUMENTS

| CN | 105891215 A | 8/2016 |
| CN | 106096504 A | 11/2016 |
| CN | 106127159 A | 11/2016 |
| EP | 1345161 A2 | 9/2003 |
| WO | 2016/074247 A1 | 5/2016 |

OTHER PUBLICATIONS

Zhao et al., "Pedestrian Detection Based on Fast R-CNN and Batch Normalization", Intelligent Computing Theories and Application, vol. 10361, Jul. 20, 2017, pp. 735-746.
Nair et al., "Rectified Linear Units Improve Restricted Boltzmann Machines", Proceedings of the 27th International Conference on International Conference on Machine Learning, Jun. 2010,8 pages.
Krizhevsky et al., "ImageNet Classification with Deep Convolutional Neural Networks", Advances in neural information processing systems, vol. 25, No. 2, Jan. 2012, pp. 1-9.
Maas et al., "Rectifier Nonlinearities Improve Neural Network Acoustic Models", Proceedings of the 30th International Conference on Machine Learning, vol. 28, 2013, 6 pages.
He et al., "Delving Deep into Rectifiers: Surpassing Human-Level Performance on ImageNet Classification", Proceedings of the 2015 IEEE International Conference on Computer Vision (ICCV), Dec. 2015, pp. 1026-1034.
Clevert et al., "Fast and Accurate Deep Network Learning by Exponential Linear Units (ELUs)", Proceedings International Conference Learning Representations, 2016, pp. 1-14.
Ioffe et al., "Batch Normalization: Accelerating Deep Network Training by Reducing Internal Covariate Shift", Proceedings of the 32nd International Conference on MachineLearning, vol. 37, 2015, 9 pages.

"Welcome to the KITTI Vision Benchmark Suite", CVLIBS, KIT, Retrieved on Jan. 23, 2020, Webpage available at : http://www.cvlibs.net/datasets/kitti/.
Simonyan et al., "Very Deep Convolutional Networks for Large-Scale Image Recognition", arXiv, 2015, pp. 1-14.
Ren et al., "Faster R-CNN: Towards Real-Time Object Detection with Region Proposal Networks", arXiv, 2015, pp. 1-14.
Huang et al., "Adaptive Deep Supervised Autoencoder Based Image Reconstruction for Face Recognition", Mathematical Problems in Engineering, vol. 2016, 2016, pp. 1-14.
Wollmer et al., "Multi-stream LSTM-HMM Decoding and Histogram Equalization for Noise Robust Keyword Spotting", Cognitive Neurodynamics, vol. 5, No. 3, 2011, pp. 253-264.
Kahou et al., "Recurrent Neural Networks for Emotion Recognition in Video", Proceedings of the ACM on International Conference on Multimodal Interaction, Nov. 2015, pp. 467-474.
Klambauer et al., "Self-Normalizing Neural Networks", arXiv, Sep. 7, 2017, pp. 1-102.
Lin et al., "Network In Network", arXiv, Mar. 4, 2014, pp. 1-10.
Srivastava et al., "Dropout: A Simple Way to Prevent Neural Networks from Overfitting", Journal of Machine Learning Research, vol. 15, No. 1, 2014, pp. 1929-1958.
Xu et al., "Empirical Evaluation of Rectified Activations in Convolution Network", arXiv, May 5, 2015, 5 pages.
Wang et al., "A Fast Implementation of Adaptive Histogram Equalization", 8th International Conference on Signal Processing, Nov. 16-20, 2006, 4 pages.
Wang et al., "Fast Histogram Equalization for Medical Image Enhancement", 30th Annual International Conference of the IEEE Engineering in Medicine and Biology Society, Aug. 20-24, 2008, pp. 2217-2220.
Jain et al., "Statistical Pattern Recognition: A Review", IEEE Transactions on Pattern Analysis and Machine Intelligence, vol. 22, No. 1, Jan. 2000, pp. 4-37.
Coates et al., "An Analysis of Single-Layer Networks in Unsupervised Feature Learning", Proceedings of the Fourteenth International Conference on Artificial Intelligence and Statistics (PMLR), vol. 15, 2011, pp. 215-223.
Krizhevsky et al., "Learning Multiple Layers of Features from Tiny Images", Tech Report, Apr. 8, 2009, 60 pages.
International Search Report and Written Opinion received for corresponding Patent Cooperation Treaty Application No. PCT/CN2017/098317, dated May 18, 2018, 9 pages.

METHOD, SYSTEM AND APPARATUS FOR PATTERN RECOGNITION

RELATED APPLICATION

This application was originally filed as Patent Cooperation Treaty Application No. PCT/CN2017/098317 filed Aug. 21, 2017.

TECHNICAL FIELD

Embodiments of the present invention relate generally to the field of pattern recognition, more particularly, to a method, system and apparatus for pattern recognition.

BACKGROUND

Object detection, as a specific form of pattern recognition, is a classic computer vision task. Recently, with development of big data and high-performance computing devices, object detection with deep Convolutional Neural Network (CNN) has achieved great success. CNN based object detection can be applied in various fields. For example, in a driverless car, the CNN based object detection system can process in real time the image data captured by the cameras installed on the car to detect various objects appearing in front of the car, and give warnings or even stop the car automatically when objects such as vehicles, pedestrians are detected near the car.

Generally, a CNN used for object detection mainly consists of several sets of three basic layers: a convolutional layer, an activation function layer, and a pooling layer. A Rectified Linear Unit (ReLU) is widely used as the activation function. To reduce the influence of internal covariate shift, batch normalization is also proposed. A batch normalization layer is added after a convolutional layer and before an activation layer.

Internal covariate shift means the change in the distribution of network activations due to the change in network parameters during training. To address internal covariate shift, the batch normalization layer takes a normalization step that fixes the means and variances of layer inputs (see S. Ioffe and C. Szegedy, *Batch Normalization: Accelerating Deep Network Training by Reducing Internal Covariate Shift*, Proc. International Conf Machine Learning, 2015, which is herein incorporated by reference in its entirety). Based on batch normalization, the deep CNN can easily converge and further improve performance. Because the batch normalization layer is before the ReLU layer, most of the inputs of the ReLU layer are near zero.

Compared to the saturating non-linear activation (e.g., sigmoid function), ReLU can greatly accelerate training speed. Thus, ReLU has become the most popular activation function for deep CNN. ReLU only activates the input if the input is larger than zero. Otherwise, if the input of ReLU is equal to or smaller than zero, the output of activation layer is not activated (i.e., equal to zero). Since most inputs of ReLU are near zero, the output of the ReLU is sensitive to the jitter of the input. Thus, the learned CNN model is likely sensitive to the jitter.

Based on ReLU, many improvements have been also proposed recently. To solve the vanishing gradients problem of ReLU, leaky ReLU (see A. L. Maas, A. Y. Hannun, A. Y. Ng, *Rectifier Nonlinearities Improve Neural Network Acoustic Models*, Proc. International Conf Machine Learning, 2013, which is herein incorporated by reference in its entirety.) and PReLU (see K. He, X. Zhang, S. Ren, and J. Sun, *Delving Deep into Rectifiers: Surpassing Human-Level Performance on ImageNet Classification*, Proc. IEEE International Conf Computer Vision, 2015, which is herein incorporated by reference in its entirety.) are proposed, which give a small gradient if the input is negative. Though LReLU and PReLU can solve the problem of vanishing gradients, they are still sensitive to the jitter of input if the input is near zero. Recently, ELUs (see D. Clevert, T. Unterthiner, and S. Hochreiter, *Fast and Accurate Deep Network Learning by Exponential Linear Units (ELUs)*, Proc. International Conf Learning Representations, 2016, which is herein incorporated by reference in its entirety.) is proposed, which gives an exponential mapping if the input is negative. Compared to LReLU and PReLU, ELUs is smoother. However, it still cannot solve the problem that the output is sensitive to jitter of the input totally.

BRIEF SUMMARY

A method, apparatus, and system for pattern recognition, as well as a computer readable medium, a method for implementing a convolutional neural network and a convolutional neural network are therefore provided.

In one example embodiment, a method for pattern recognition is described. The method comprises: receiving data; processing the data with a trained convolutional neural network so as to recognize a pattern in the data, wherein the convolutional neural network comprises at least: an input layer, at least one convolutional layer, at least one batch normalization layer, at least one activation function layer, and an output layer; and wherein processing the data with a trained convolutional neural network so as to recognize a pattern in the data comprises: processing values outputted by a batch normalization layer so that the histogram of the processed values is flatter than the histogram of the values, and outputting the processed values to an activation function layer.

In another example embodiment, an apparatus for pattern recognition is described. The apparatus comprises: at least one processor, at least one memory including computer program code; the at least one processor and the computer program code configured to, with the at least one processor, cause the apparatus to: receive data; process the data with a trained convolutional neural network so as to recognize a pattern in the data, wherein the convolutional neural network comprises at least: an input layer, at least one convolutional layer, at least one batch normalization layer, at least one activation function layer, an output layer, and a histogram specification layer disposed between at least one batch normalization layer and at least one activation function layer; and wherein the histogram specification layer is configured to receive values outputted by the batch normalization layer, process the values so that the histogram of the processed values is flatter than the histogram of the values, and output the processed values to the activation function layer.

In another example embodiment, a system for pattern recognition, comprising: a receiving unit configured to receive data; and a convolutional neural network configured to, after being trained, process the data, so as to recognize a pattern in the data, wherein the convolutional neural network comprises at least: an input layer, at least one convolutional layer, at least one batch normalization layer, at least one activation function layer, an output layer, and a histogram specification layer disposed between at least one batch normalization layer and at least one activation function layer; and wherein the histogram specification layer is configured to receive values output by the batch normalization layer, process the values so that the histogram of the processed values is flatter than the histogram of the values, and output the processed values to the activation function layer.

In another example embodiment, a computer readable medium encoded with instructions that, when executed by a computer, cause performance of a method according to any embodiment of the present invention.

In another example embodiment, a method for implementing a convolutional neural network, comprising: providing a convolutional neural network comprising at least: an input layer, at least one convolutional layer, at least one batch normalization layer, at least one activation function layer, and an output layer; and adding a histogram specification layer between at least one batch normalization layer and at least one activation function layer, wherein the histogram specification layer is configured to receive values outputted by the batch normalization layer, process the values so that the histogram of the processed values is flatter than the histogram of the values, and output the processed values to the activation function layer.

In another example embodiment, a convolutional neural network, comprising at least: an input layer, at least one convolutional layer, at least one batch normalization layer, at least one activation function layer, an output layer, and a histogram specification layer disposed between at least one batch normalization layer and at least one activation function layer, wherein the histogram specification layer is configured to receive values outputted by the batch normalization layer, process the values so that the histogram of the processed values is flatter than the histogram of the values, and outputted the processed values to the activation function layer.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

To make the learned CNN model more robust to the jitter of the input, an embodiment of the present invention proposes to add a histogram specification layer into the CNN architecture. Specifically, the histogram specification layer is added before the activation function layer (e.g., ReLU layer) and after batch normalization layer. Finally, the CNN model including the histogram specification layer can be used for pattern recognition, such as object detection.

Figure 1:
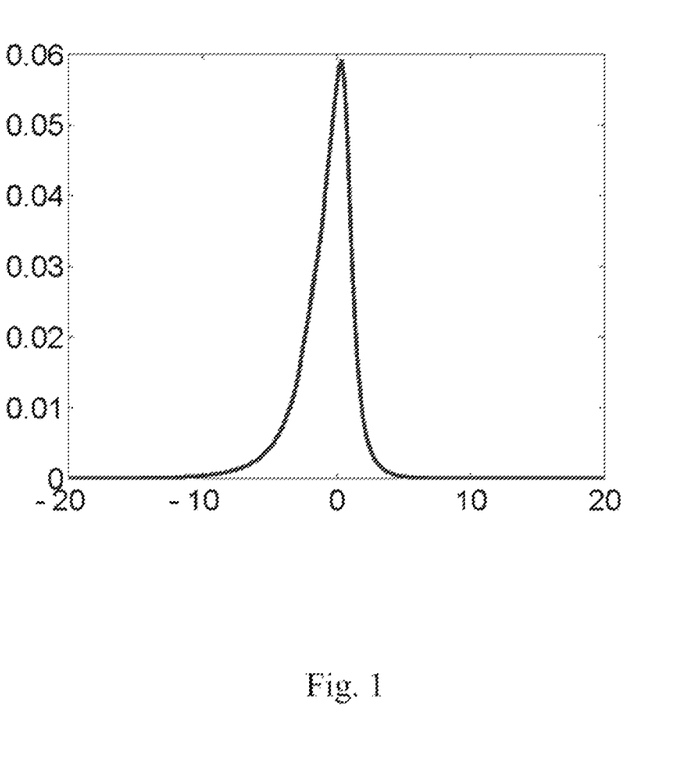
FIG. 1 shows an example of a distribution of inputs of the ReLU layer.

Referring to FIG. 1, there is shown an example of a distribution of inputs of the ReLU layer. It can be seen that the distribution is like a Gaussian distribution and most of the inputs of the ReLU layer are near zero.

Figure 2:
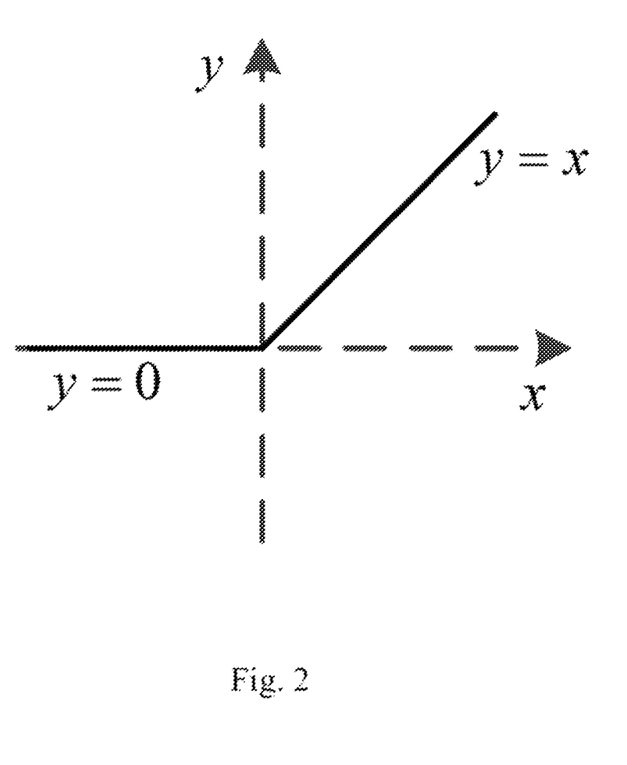
FIG. 2 shows an illustration of a ReLU.

Referring to FIG. 2, there is shown an illustration of a ReLU. The ReLU can be expressed as follows:

$$y = \begin{cases} x, & \text{if } x > 0, \\ 0, & \text{if } x \leq 0, \end{cases} \quad (1)$$

where x and y are the input and the output of the ReLU, respectively. Namely, the ReLU only activates the input if the input is larger than zero.

In fact, the signal often contains noise. Thus, the input of the ReLU can be expressed as two parts: the pure input and the noise (or the jitter). Namely, $x = x^o + x^n$. Then, the ReLU can be re-written as:

$$y = \begin{cases} x^o + x^n, & \text{if } x^o + x^n > 0, \\ 0, & \text{if } x^o + x^n \leq 0, \end{cases} \quad (2)$$

where $x^o$ and $x^n$ are the pure input and the noise, respectively. When the pure input (i.e., $x^o$) is near zero, the output (i.e., y) is sensitive to the jitter (i.e., $x^n$). For example, the pure input (i.e., $x^o$) is larger than zero and the jitter (i.e., $x^n$) is smaller than $-x^o$, the output (i.e., y) is mistakenly deactivated (i.e., zero). However, it should have been activated.

Because the jitter is often small, the output would not be sensitive to the jitter if the original input is far from zero. That is, if the inputs of the ReLU layer are more scattered and far from zero, the learned CNN model would be more robust to the jitter.

In an embodiment, in order to make the inputs of the ReLU layer more scattered and far from zero, a histogram specification layer may be added after the batch normalization layer and before the ReLU layer. The histogram specification layer may process the values received from the batch normalization layer so that the histogram of the processed values is flatter than the histogram of the values, and output the processed values to the ReLU layer.

In a further embodiment, the histogram specification layer may be a histogram equalization layer which perform histogram equalization on the values received from the batch normalization layer. As a specific example, the specific steps of histogram equalization may be summarized as follows:

(1) For the output channel of the batch normalization layer, obtain the minimum $x_{min}$ and the maximum $x_{max}$. Transform the values of the output (i.e., x) to [0, L−1] discrete values by $$y = \text{round}\left(\frac{x - x_{min}}{x_{max} - x_{min}} \times (L - 1)\right), \quad (3)$$

where L is a specified total number of all possible discrete integer values of y, round( ) rounds to the nearest integer.

(2) Compute the probability of occurrences of the output where $x = x_k$ corresponding to y=k as follows:

$$p_x(x_k) = p_y(k) = \frac{n_k}{n}, \ 0 \leq i \leq L - 1, \quad (4)$$

where $x_k \in [(k-0.5) \times (x_{max} - x_{min})/(L-1) + x_{min}, (k+0.5) \times (x_{max} - x_{min})/(L-1) + x_{min})$, $n_k$ is the number of the outputs where y=k corresponding to x=$x_k$, and n is the number of all the outputs of the batch normalization layer.

(3) Compute the cumulative probability distribution $p_x^{cd}$ ($x_k$) according to $p_x(x_k)$ as $$p_x^{cd}(x_k) = \sum_{j=0}^{k} p_x(j), \quad (5)$$

(4) Map the original value (i.e., x) to a new value (i.e., z) as follows $$z = p_x^{cd}(x_k) \times (x_{max} - x_{min}) + x_{min}, \quad (6)$$

(5) The new value (i.e., z) is outputted as the input of the ReLU.

In the back-propagation, the gradient of the input in histogram equalization layer can be calculated as $$\frac{dz}{dx} = (x_{max} - x_{min}) \times p_x(x_k) = (x_{max} - x_{min}) \times \frac{n_k}{n} \quad (7)$$

Figure 3:
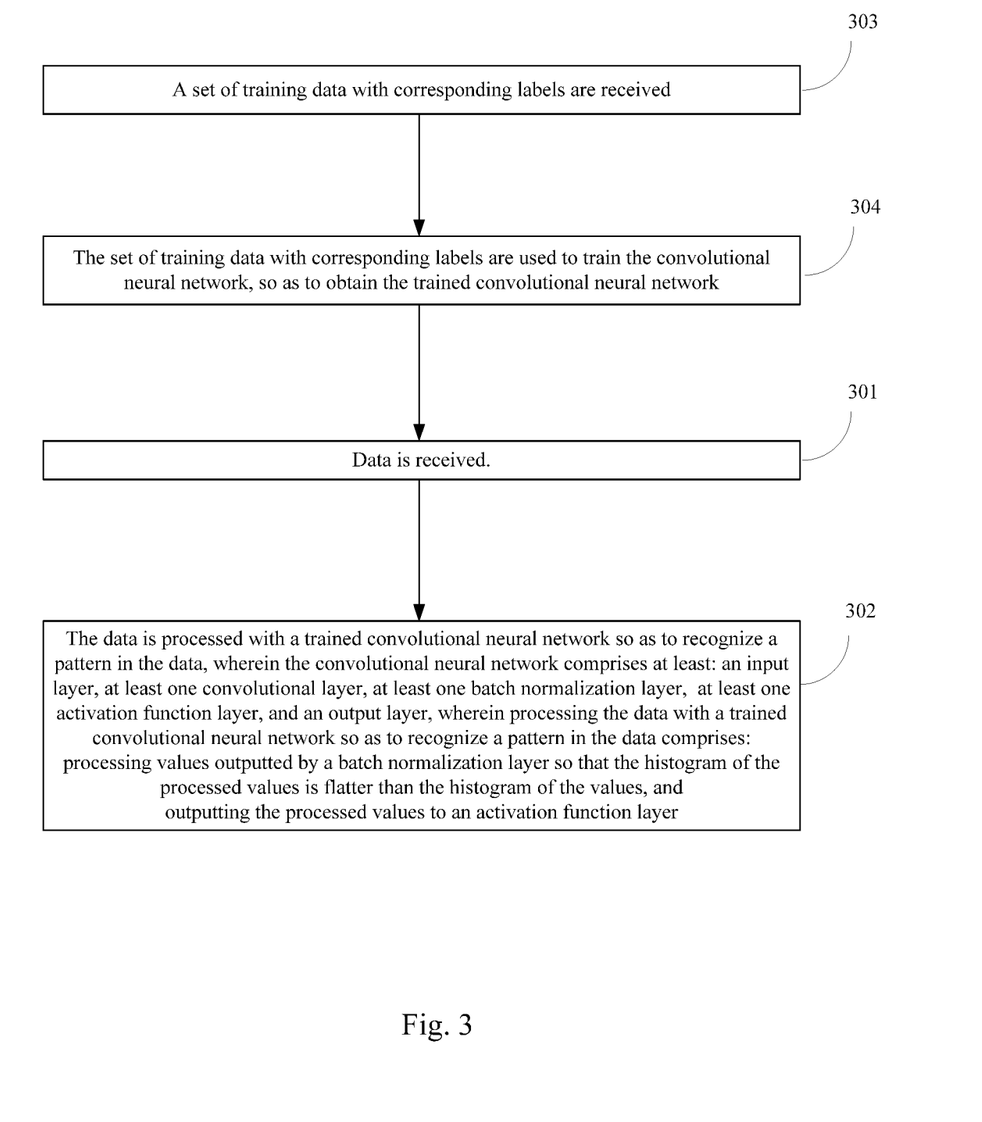
FIG. 3 shows a flowchart of a method for pattern recognition according to an example embodiment of the present invention.

Referring now to FIG. 3, there is shown a flowchart of a method for pattern recognition according to an embodiment of the present invention. As shown, the method comprises the following steps:

In step 301, data is received. The data may be any data on which pattern recognition is to be performed. For example, the data may be image data or video data on which object detection may be performed in order to find or classify objects in the image or video. Such image data may be captured by a camera in real time or otherwise obtained, such as from a storage or a network such as the Internet. For another example, the data may be audio data on which voice pattern detection may be performed for speech recognition. Such audio data may be captured by a microphone in real time or otherwise obtained, such as from a storage or a network such as the Internet.

In step 302, the data is processed with a trained convolutional neural network so as to recognize a pattern in the data, wherein the convolutional neural network comprises at least: an input layer, at least one convolutional layer, at least one batch normalization layer, at least one activation function layer, and an output layer, wherein processing the data with a trained convolutional neural network so as to recognize a pattern in the data comprises:

processing values outputted by a batch normalization layer so that the histogram of the processed values is flatter than the histogram of the values, and outputting the processed values to an activation function layer.

In an embodiment, the operations of processing values outputted by a batch normalization layer so that the histogram of the processed values is flatter than the histogram of the values, and outputting the processed values to an activation function layer may be performed by a histogram specification layer disposed between at least one batch normalization layer and at least one activation function layer, wherein the histogram specification layer may be configured to receive values outputted by the batch normalization layer, process the values so that the histogram of the processed values is flatter than the histogram of the values, and output the processed values to the activation function layer.

Thus, the convolutional neural network according to an embodiment may be formed by adding a histogram specification layer between at least one batch normalization layer and at least one activation function layer of an existing convolutional neural network or a convolutional neural network to be developed in the future which includes at least one batch normalization layer and at least one activation function layer.

Figure 4:
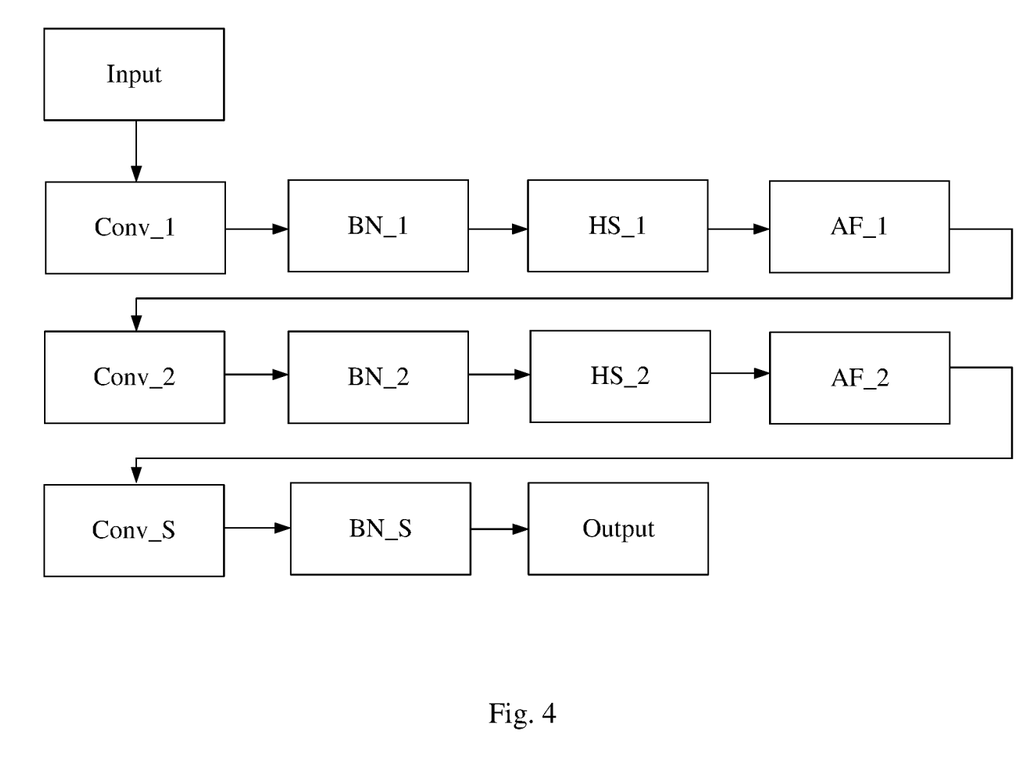
FIG. 4 shows an exemplary structure of a convolutional neural network according to an example embodiment of the present invention.

Referring to FIG. 4, there is shown an exemplary structure of a convolutional neural network according to an example embodiment of the present invention. As shown, the convolutional neural network includes an input, an output, and S stages (S may be any integer greater than or equal to 1), each of the first S−1 stages includes a convolutional layer Conv_1, Conv_2 . . . , a batch normalization layer BN_1, BN_2 . . . , a histogram specification layer HS_1, HS_2 . . . , and an activation function layer AF_1, AF_2 . . . , the histogram specification layer HS_1, HS_2 . . . is disposed between the batch normalization layer BN_1, BN_2 . . . and the activation function layer AF_1, AF_2 . . . , and the last stage includes a convolutional layer Conv_S and a batch normalization layer BN_S. As a specific example, the histogram specification layer HS_1, HS_2 . . . may be a histogram equalization layer, and the activation function layer AF_1, AF_2 . . . may be a Rectified Linear Unit (LeLU) layer or a variant thereof. It is to be noted that the structure of a convolutional neural network as shown in FIG. 4 and described above is only an example, not limitation to the present invention. For example, a convolutional neural network according to some embodiments may further include other layers, such as at least one pooling layer, at least one fully connection layer, etc.

In an example embodiment, processing values outputted by a batch normalization layer so that the histogram of the processed values is flatter than the histogram of the values comprises: processing values outputted by a batch normalization layer so that the histogram of the processed values is equalized. That is, the histogram specification layer disposed between a batch normalization layer and a function activation layer may specifically be a histogram equalization layer configured to perform histogram equalization on the values outputted by the batch normalization layer to obtain the processed values. Specifically, the histogram equalization layer may perform histogram equalization on the values outputted by the batch normalization layer through the steps as described above.

In a further example embodiment, processing values outputted by a batch normalization layer so that the histogram of the processed values is equalized comprises: performing a fast histogram equalization operation on values outputted by a batch normalization layer so that the histogram of the processed values is equalized. Such a fast histogram equalization operation can be used to accelerate computation speed of the histogram specification layer and lower the computation cost of the convolutional neural network. Such a fast histogram equalization operation may be performed using various methods, such as those described in Z. Wang and J. Tao, *A Fast Implementation of Adaptive Histogram Equalization, ICSP,* 2006, and Q. Wang, L. Chen, and D. Shen, *Fast Histogram Equalization for Medical Image Enhancement, IEEE EMBS,* 2008, which are herein incorporated by reference in their entirety.

In an example embodiment, the activation function layer may a layer of Rectified Linear Unit (ReLU) or a variant thereof. The variant of ReLU may be, for example, leaky ReLU, PReLU and ELUs as described above.

In an example embodiment, the method may further comprise a step of extracting a pattern proposal from the data; wherein processing the data with a trained convolutional neural network to so as to recognize a pattern in the data comprises: processing the pattern proposal with the trained convolutional neural network to recognize a pattern from the pattern proposal. That is, in the case of image data, first, object proposals may be extracted from the data, and then, for each object proposal, it may be sent to the trained convolutional neural network to recognize an object from the object proposal. Various method such as Region Proposal Network (RPN) may be used to extract a pattern proposal from the data. In the case that a plurality of object proposals are extracted and a plurality of objects are recognized which may overlap with one another, the highly-overlapping objects may be combined using a method such as Non-Maximum Suppression (NMS).

The trained convolutional neural network may be obtained by training a convolutional neural network. Thus, in an example embodiment, the method may further comprise the following steps:

In step 303, a set of training data with corresponding labels are received; and In step 304, the set of training data with corresponding labels are used to train the convolutional neural network, so as to obtain the trained convolutional neural network.

The method for pattern recognition according to an embodiment of the present invention utilizes histogram equalization to make the inputs of a ReLU of the CNN more scattered, resulting that the output of the ReLU is less sensitive to the jitter of the inputs, thus helping to improve the robustness of the trained CNN model and then improve the performance of pattern recognition such as object detection.

While a flowchart of a method for pattern recognition according to some embodiments of the present invention has been described with reference to FIG. 3, it will be noted that the above description and figure are only exemplary illustration, rather than limitation to the present invention. In other embodiments of the present invention, the method may include more, less or different steps than those described and illustrated, and the relationships of order, inclusion, function etc. among those steps may be different from those described and illustrated.

It will be further understood that each block of the flowchart, and combinations of blocks in the flowcharts may be implemented by various means, such as hardware, firmware, processor, circuitry, and/or other devices associated with execution of software including one or more computer program instructions. For example, one or more of the steps of the method above may be embodied by computer program instructions. In this regard, the computer program instructions which embody the steps described above may be stored by a memory device of an apparatus according to an example embodiment of the present invention as described hereinafter and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In an example embodiment, certain ones of the operations above may be modified or further amplified. Furthermore, in an example embodiment, additional optional operations may be included. Modifications, additions, or amplifications to the operations above may be performed in any order and in any combination.

Figure 5:
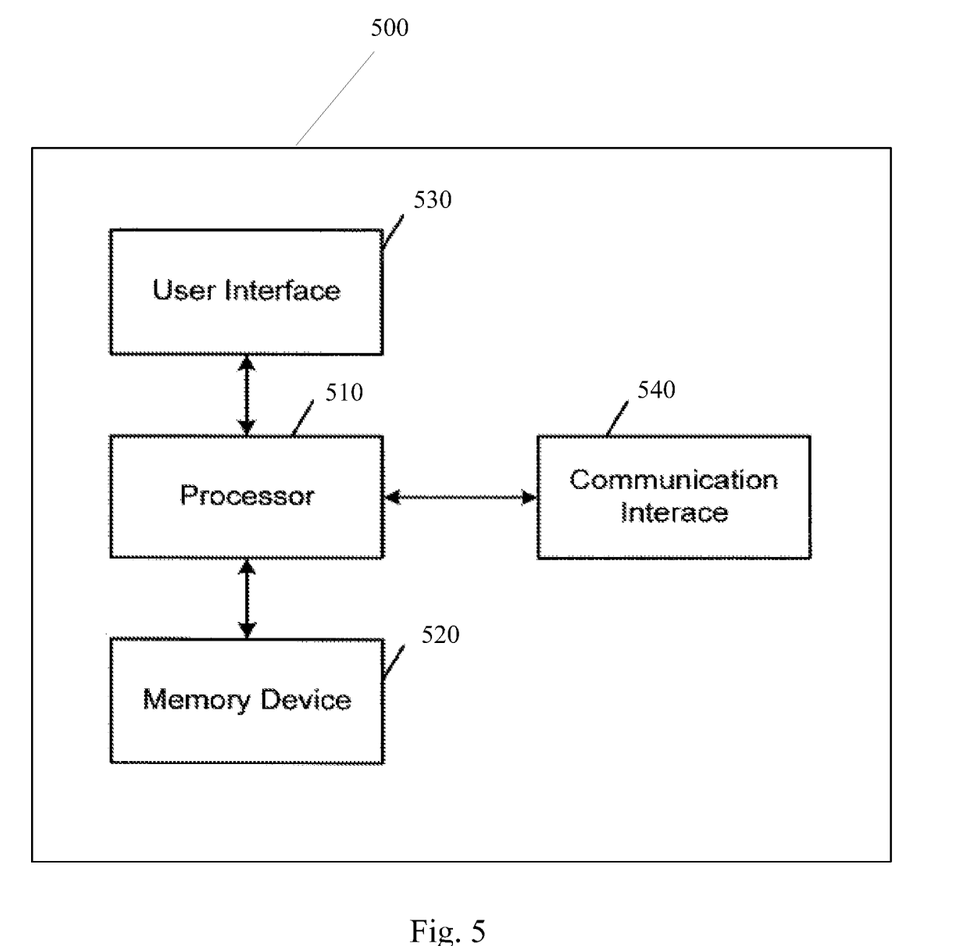
FIG. 5 shows a schematic diagram of an apparatus for pattern recognition according to an example embodiment of the present invention.

Referring to FIG. 5, there is shown a schematic diagram of the apparatus 500 for pattern recognition according to an example embodiment of the present invention. Apparatus 500 may comprise at least one processor 510, at least one memory 520 including computer program code; the at least one memory 520 and the computer program code configured to, with the at least one processor 510, cause the apparatus 500 to: receive data; process the data with a trained convolutional neural network so as to recognize a pattern in the data, wherein the convolutional neural network comprises at least: an input layer, at least one convolutional layer, at least one batch normalization layer, at least one activation function layer, an output layer, and a histogram specification layer disposed between at least one batch normalization layer and at least one activation function layer; and wherein the histogram specification layer is configured to receive values outputted by the batch normalization layer, process the values so that the histogram of the processed values is flatter than the histogram of the values, and output the processed values to the activation function layer.

In an example embodiment, the apparatus may further comprise an optional user interface 530 and/or an optional communication interface 540 for receiving the data.

In an example embodiment, the histogram specification layer is configured to perform histogram equalization on the values outputted by the batch normalization layer to obtain the processed values.

In a further example embodiment, the histogram specification layer is configured to perform a fast histogram equalization operation on the values outputted by the batch normalization layer to obtain the processed values.

In an example embodiment, the at least one memory 520 and the computer program code are further configured to, with the at least one processor 510, cause the apparatus 500 to: extract a pattern proposal from the data; wherein to process the data with a trained convolutional neural network so as to recognize a pattern in the data comprises: to process the pattern proposal with the trained convolutional neural network to recognize a pattern from the pattern proposal.

In an example embodiment, the at least one memory 520 and the computer program code are further configured to, with the at least one processor 510, cause the apparatus 500 to: receive a set of training data with corresponding labels;

use the set of training data with corresponding labels to train the convolutional neural network, so as to obtain the trained convolutional neural network.

In an example embodiment, the activation function layer is a layer of ReLU or a variant thereof.

In an example embodiment, the processor 510 (and/or co-processors or any other processing circuitry assisting or otherwise associated with the processor 510) may be in communication with the memory 520 via a bus for passing information among components of the apparatus 500. The memory 520 may include, for example, one or more volatile and/or non-volatile memories. In other words, for example, the memory 520 may be an electronic storage device (for example, a computer readable storage medium) comprising gates configured to store data (for example, bits) that may be retrievable by a machine (for example, a computing device like the processor 510). The memory 520 may be configured to store information, data, applications, instructions, or the like for enabling the apparatus 500 to carry out various functions in accordance with an example embodiment of the present invention. For example, the memory 520 could be configured to buffer input data for processing by the processor 510. Additionally or alternatively, the memory device 520 could be configured to store instructions for execution by the processor 510.

The apparatus 500 may be embodied as a chip or chip set. In other words, the apparatus 500 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 500 may therefore, in some cases, be configured to implement an example embodiment of the present invention on a single chip or as a single "system on a chip." As such, in some cases, a chip or chipset may constitute means for performing one or more operations for providing the functionalities described herein.

The processor 510 may be embodied in a number of different ways. For example, the processor 210 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in an example embodiment, the processor 510 may include one or more processing cores configured to perform independently. A multi-core processor may enable multiprocessing within a single physical package. Additionally or alternatively, the processor 510 may include one or more processors configured in tandem via the bus to enable independent execution of instructions, pipelining and/or multithreading.

In an example embodiment, the processor 510 may be configured to execute instructions stored in the memory 520 or otherwise accessible to the processor 510. Alternatively or additionally, the processor 510 may be configured to execute hard coded functionality. As such, whether configured by hardware or software methods, or by a combination thereof, the processor 510 may represent an entity (for example, physically embodied in circuitry) capable of performing operations according to an example embodiment of the present invention while configured accordingly. Thus, for example, when the processor 510 is embodied as an ASIC, FPGA or the like, the processor 510 may be specifically configured hardware for conducting the operations described herein. Alternatively, as another example, when the processor 510 is embodied as an executor of software instructions, the instructions may specifically configure the processor 510 to perform the algorithms and/or operations described herein when the instructions are executed. However, in some cases, the processor 510 may be a processor of a specific device (for example, a mobile terminal or network entity) configured to employ an example embodiment of the present invention by further configuration of the processor 510 by instructions for performing the algorithms and/or operations described herein. The processor 510 may include, among other things, a clock, an arithmetic logic unit (ALU) and logic gates configured to support operation of the processor 510.

Meanwhile, the optional communication interface 540 may be any means such as a device or circuitry embodied in either hardware or a combination of hardware and software that is configured to receive and/or transmit data from/to a network and/or any other device or module in communication with the apparatus 500. In this regard, the communication interface 540 may include, for example, an antenna (or multiple antennas) and supporting hardware and/or software for enabling communications with a wireless communication network. Additionally or alternatively, the communication interface 540 may include the circuitry for interacting with the antenna(s) to cause transmission of signals via the antenna(s) or to handle receipt of signals received via the antenna(s). In some environments, the communication interface 240 may alternatively or also support wired communication. As such, for example, the communication interface 540 may include a network interface card, a communication modem and/or other hardware/software for supporting communication via optical fiber, cable, digital subscriber line (DSL), universal serial bus (USB) or other mechanisms.

In an example embodiment, the apparatus 500 may include a user interface 530 that may, in turn, be in communication with the processor 510 to receive an indication of, or relating to, a user input and/or to cause provision of an audible, visual, mechanical or other output to the user. As such, the user interface 530 may include, for example, a keyboard, a mouse, a joystick, a display, a touch screen(s), touch areas, soft keys, a microphone, a speaker, or other input/output mechanisms.

While an apparatus for pattern recognition according to some embodiments of the present invention has been described with reference to FIG. 5, it will be noted that the above description and figure are only exemplary illustration, rather than limitation to the present invention. In other embodiments of the present invention, the apparatus may include more, less or different components than those described and illustrated, and the relationships of connection, inclusion, function etc. among those components may be different from those described and illustrated.

In a further aspect of the present invention, there is provided a system for pattern recognition, comprising: a receiving unit configured to receive data; and a convolutional neural network configured to, after being trained, process the data, so as to recognize a pattern in the data, wherein the convolutional neural network comprises at least: an input layer, at least one convolutional layer, at least one batch normalization layer, at least one activation function layer, an output layer, and a histogram specification layer disposed between at least one batch normalization layer and at least one activation function layer; and wherein the histogram specification layer is configured to receive values output by the batch normalization layer, process the values so that the histogram of the processed values is flatter than the histogram of the values, and output the processed values to the activation function layer.

In an exemplary embodiment, the histogram specification layer is configured to perform histogram equalization on the values outputted by the batch normalization layer to obtain the processed values.

In an exemplary embodiment, the system may further comprises: a pattern proposal extracting unit configured to extract a pattern proposal from the data; wherein the trained convolutional neural network is configured to process the pattern proposal to recognize a pattern from the pattern proposal.

In an exemplary embodiment, the activation function layer is a layer of ReLU or a variant thereof.

The system may be embodied in software, firmware, hardware or a combination thereof. For example, the system may be embodied in one or more computer programs which may be stored in a storage medium or a memory device and may be loaded and executed by a processing device so as to perform the functions of the system. As another example, the system may be embodied in a computing device configured by one or more computer programs to perform the functions of the system.

In another embodiment of the present invention, there is provided a computer readable medium encoded with instructions that, when executed by a computer, cause performance of a method for pattern recognition according to any one embodiment of the present invention as described above.

In still another embodiment of the present invention, there is provided a method for implementing a convolutional neural network, comprising: providing a convolutional neural network comprising at least: an input layer, at least one convolutional layer, at least one batch normalization layer, at least one activation function layer, and an output layer; and adding a histogram specification layer between at least one batch normalization layer and at least one activation function layer, wherein the histogram specification layer is configured to receive values outputted by the batch normalization layer, process the values so that the histogram of the processed values is flatter than the histogram of the values, and output the processed values to the activation function layer.

In an exemplary embodiment, the histogram specification layer is configured to perform histogram equalization on the values outputted by the batch normalization layer to obtain the processed values.

In an exemplary embodiment, the histogram specification layer is configured to perform a fast histogram equalization operation on the values outputted by the batch normalization layer to obtain the processed values.

In still another embodiment of the present invention, there is provided a convolutional neural network, comprising at least: an input layer, at least one convolutional layer, at least one batch normalization layer, at least one activation function layer, an output layer, and a histogram specification layer disposed between at least one batch normalization layer and at least one activation function layer, wherein the histogram specification layer is configured to receive values outputted by the batch normalization layer, process the values so that the histogram of the processed values is flatter than the histogram of the values, and outputted the processed values to the activation function layer.

In an exemplary embodiment, the histogram specification layer is configured to perform histogram equalization on the values outputted by the batch normalization layer to obtain the processed values.

In an exemplary embodiment, the histogram specification layer is configured to perform a fast histogram equalization operation on the values outputted by the batch normalization layer to obtain the processed values.

The convolutional neural network may be embodied in software, firmware, hardware or a combination thereof. For example, the convolutional neural network may be embodied in one or more computer programs which may be stored in a storage medium or a memory device and may be loaded and executed by a processing device. For another example, the convolutional neural network may be embodied in a computing device configured by one or more computer programs.

To demonstrate the effectiveness of the inventive solution, the following experiment has been conducted on the CIFAR-10 dataset (the dataset was published in the paper: A. Krizhevsky, *Learning Multiple Layers of Features From Tiny Images, Tech Report,* 2009). Specifically, the salt and pepper noise is injected into the input images. Table 1 compares the inventive solution according to an exemplary embodiment with a classical solution where histogram equalization is not used before the ReLU. The parameter d is the density of noise. It can be seen that the inventive solution has better performance than the classical solution. The miss rate of the inventive solution increases slower than that of the classical solution with the increment of the density of noise. This means that the inventive solution is more robust to the jitter.

TABLE 1

| Miss rates on CIFAR-10 | | | | |
| --- | --- | --- | --- | --- |
| d | 0 | 0.001 | 0.005 | 0.01 |
| Classical solution | 8.21 | 9.63 | 18.94 | 26.75 |
| Our solution | 7.30 | 8.41 | 16.10 | 23.63 |
| Δ | 0.91 | 1.22 | 2.84 | 3.12 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for pattern recognition, comprising:
   receiving data;
   processing the data with a trained convolutional neural network so as to recognize a pattern in the data, wherein the trained convolutional neural network comprises at least: an input layer, at least one convolutional layer, at least one batch normalization layer, at least one activation function layer, and an output layer; and wherein processing the data with the trained convolutional neural network so as to recognize the pattern in the data comprises:
processing values outputted by the at least one batch normalization layer so that a histogram of processed values is flatter than a histogram of the values, and outputting the processed values to an activation function layer.

2. The method of claim 1, wherein processing the values outputted by the at least one batch normalization layer so that the histogram of the processed values is flatter than the histogram of the values further comprises:
processing values outputted by the at least one batch normalization layer so that the histogram of the processed values is equalized.

3. The method of claim 2, wherein processing the values outputted by the at least one batch normalization layer so that the histogram of the processed values is equalized further comprises:
performing a fast histogram equalization operation on the values outputted by the at least one batch normalization layer so that the histogram of the processed values is equalized.

4. The method of claim 1, further comprising:
extracting a pattern proposal from the data;
wherein processing the data with the trained convolutional neural network to so as to recognize the pattern in the data further comprises:
processing the pattern proposal with the trained convolutional neural network to recognize a pattern from the pattern proposal.

5. The method of claim 1, further comprising:
receiving a set of training data with corresponding labels;
using the set of the training data with the corresponding labels to train a convolutional neural network, so as to obtain the trained convolutional neural network.

6. The method of claim 1, wherein the activation function layer is a layer of Rectified Linear Unit or a variant thereof.

7. The method of claim 1, wherein the convolutional neural network further comprises a histogram specification layer disposed between the at least one batch normalization layer and the at least one activation function layer; and
wherein the steps of processing the values outputted by the at least batch normalization layer so that the histogram of the processed values is flatter than the histogram of the values, and outputting the processed values to the at least one activation function layer are performed by the histogram specification layer.

8. An apparatus for pattern recognition, comprising:
at least one processor,
at least one memory including computer program code;
the at least one memory and the computer program code configured to, with the at least one processor, cause the apparatus to:
receive data;
process the data with a trained convolutional neural network so as to recognize a pattern in the data,
wherein the trained convolutional neural network comprises at least: an input layer, at least one convolutional layer, at least one batch normalization layer, at least one activation function layer, an output layer, and a histogram specification layer disposed between the at least one batch normalization layer and the at least one activation function layer; and
wherein the histogram specification layer is configured to receive values outputted by the at least one batch normalization layer, process the values so that a histogram of processed values is flatter than a histogram of the values, and output the processed values to the at least one activation function layer.

9. The apparatus of claim 8, wherein the histogram specification layer is further configured to perform histogram equalization on the values outputted by the at least one batch normalization layer to obtain the processed values.

10. The apparatus of claim 9, wherein the histogram specification layer is further configured to perform a fast histogram equalization operation on the values outputted by the at least one batch normalization layer to obtain the processed values.

11. The apparatus of claim 8, wherein the at least one memory and the computer program code are further configured to, with the at least one processor, cause the apparatus to: extract a pattern proposal from the data;
wherein to process the data with the trained convolutional neural network so as to recognize a pattern in the data comprises:
to process the pattern proposal with the trained convolutional neural network to recognize the pattern from the pattern proposal.

12. The apparatus of claim 8, wherein the at least one memory and the computer program code are further configured to, with the at least one processor, cause the apparatus to:
receive a set of training data with corresponding labels;
use the set of the training data with the corresponding labels to train a convolutional neural network, so as to obtain the trained convolutional neural network.

13. The apparatus of claim 8, wherein the activation function layer is a layer of Rectified Linear Unit or a variant thereof.

14. A system for pattern recognition, comprising:
a receiving unit configured to receive data; and
a convolutional neural network configured to, after being trained, process the data, so as to recognize a pattern in the data,
wherein the convolutional neural network comprises at least: an input layer, at least one convolutional layer, at least one batch normalization layer, at least one activation function layer, an output layer, and a histogram specification layer disposed between at least one batch normalization layer and at least one activation function layer; and
wherein the histogram specification layer is configured to receive values output by the at least one batch normalization layer, process the values so that a histogram of processed values is flatter than a histogram of the values, and output the processed values to the activation function layer.

15. The system of claim 14, wherein the histogram specification layer is further configured to perform histogram equalization on the values outputted by the at least one batch normalization layer to obtain the processed values.

16. The system of claim 14, further comprising:
a pattern proposal extracting unit configured to extract a pattern proposal from the data;
wherein the trained convolutional neural network is configured to process the pattern proposal to recognize a pattern from the pattern proposal.

17. The system of claim 14, wherein the at least one activation function layer is a layer of Rectified Linear Unit or a variant thereof.

\* \* \* \* \*